United States Patent [19]
Gozdz et al.

[11] Patent Number: 5,460,904
[45] Date of Patent: Oct. 24, 1995

[54] ELECTROLYTE ACTIVATABLE LITHIUM-ION RECHARGEABLE BATTERY CELL

[75] Inventors: Antoni S. Gozdz, Tinton Falls; Jean-Marie Tarascon, Martinsville; Paul C. Warren, Far Hills, all of N.J.

[73] Assignee: Bell Communications Research, Inc., Livingston, N.J.

[21] Appl. No.: 160,018

[22] Filed: Nov. 30, 1993

Related U.S. Application Data

[63] Continuation-in-part of Ser. No. 110,262, Aug. 23, 1993, Pat. No. 5,418,091, which is a continuation-in-part of Ser. No. 26,904, Mar. 5, 1994, Pat. No. 5,296,318.

[51] Int. Cl.[6] ............................. H01M 6/18; H01M 2/16
[52] U.S. Cl. ...................... 429/192; 429/162; 429/185; 429/217; 429/254
[58] Field of Search ........................... 429/254, 162, 429/127, 192, 185, 217

[56] References Cited

U.S. PATENT DOCUMENTS 4,699,857  10/1987  Giovannoni et al. ............... 429/204
4,714,665  12/1987  Siegel et al. .
4,818,643   4/1989  Cook et al. ......................... 429/188
4,925,751   5/1990  Shackle et al. .................... 429/191
4,925,752   5/1990  Fauteux et al. .................... 429/191
4,990,413   2/1991  Lee et al. .......................... 429/191
5,219,680   6/1993  Fauteux ............................. 429/192
5,246,796   9/1993  Nagamine et al. ................. 429/194

FOREIGN PATENT DOCUMENTS 1459681  12/1976  United Kingdom ........... H01M 6/16

Primary Examiner—John S. Maples
Attorney, Agent, or Firm—Leonard Charles Suchyta; Lionel N. White

[57] ABSTRACT

Li-ion rechargeable battery cell electrode and electrolyte/separator elements formulated as layers of plasticized polymeric matrix compositions are laminated to form a unitary battery cell structure. The structure may be stored indefinitely, since it is essentially devoid of electrolyte solution which typically comprises a moisture-sensitive lithium salt. Prior to the battery's being put into service, the plasticizer of the polymeric composition is removed by leaching with a selective solvent and is replaced with a lithium salt electrolyte solution by simple imbibition. The battery thus activated may then be charged and recharged in the usual manner.

32 Claims, 9 Drawing Sheets

ELECTROLYTE ACTIVATABLE LITHIUM-ION RECHARGEABLE BATTERY CELL

RELATED APPLICATIONS

This application is a continuation-in-part of U.S. patent application Ser. No. 08/110,262, filed 23 Aug. 1993, now U.S. Pat. No. 5,418,091, which earlier application is itself a continuation-in-part of U.S. patent application Ser. No. 08/026,904, filed 5 Mar. 1993, now U.S. Pat. No. 5,296,318. Both prior applications are assigned to the assignee of application.

BACKGROUND OF THE INVENTION

The present invention relates to electrolytic cells comprising polymeric film composition electrodes and separator membranes and to a method of economically making such cells. In particular, the invention relates to rechargeable lithium battery cells comprising an intermediate separator element containing an electrolyte solution through which lithiumions from a source electrode material move between cell electrodes during the charge/discharge cycles of the cell. The invention is particularly useful for making such cells in which the ion source electrode is a lithium compound or other material capable of intercalating lithium ions, and where an electrode separator membrane comprises a polymeric matrix made ionically conductive by the incorporation of an organic solution of a dissociable lithium salt which provides ionic mobility.

Early rechargeable lithium cells utilized lithium metal electrodes as the ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of a lithium compound, and which also provided a means for preventing destructive contact between the electrodes of the cell. Sheets or membranes ranging from glass fiber filter paper or cloth to microporous polyolefin film or nonwoven fabric have been saturated with solutions of a lithium compound, such as $LiClO_4$, $LiPF_6$, or $LiBF_4$, in an organic solvent, e.g., propylene carbonate, diethoxyethane, or dimethyl carbonate, to form such electrolyte/separator elements. The fluid electrolyte bridge thus established between the electrodes has effectively provided the necessary $Li^+$ ion mobility at conductivities in the range of about $10^{-3}$ S/cm.

Although serving well in this role of ion conductor, these separator elements unfortunately comprise sufficiently large solution-containing voids that continuous avenues may be established between the electrodes, thereby enabling lithium dendrite formation during charging cycles which eventually leads to internal cell short-circuiting. Some success has been achieved in combatting this problem through the use of lithium-ion cells in which both electrodes comprise intercalation materials, such as lithiated manganese oxide and carbon (U.S. Pat. No. 5,196,279), thereby eliminating the lithium metal which promotes the deleterious dendrite growth. Although providing efficient power sources, these lithium-ion cells do not readily attain the capacity provided by lithium metal electrodes.

Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which are enhanced in ionic conductivity by the incorporation of a salt, typically a lithium salt such as $LiClO_4$, $LiPF_6$, or the like. A range of practical ionic conductivity, i.e, over about $10^{-5}$ to $10^{-3}$ S/cm, was only attainable with these polymer compositions at ambient conditions well above room temperature, however. Some improvement in the conductivity of the more popular poly(ethylene oxide) compositions has been reported to have been achieved by radiation-induced cross-linking (U.S. Pat. No. 5,009,970) or by meticulous blending with exotic ion-solvating polymer compositions (U.S. Pat. No. 5,041,346). Each of these attempts achieved limited success due to attendant expense and restricted implementation in commercial practice.

Some earlier examinations of poly(vinylidene fluoride) polymers and related fluorocarbon copolymers with trifluoroethylene or tetrafluoroethylene revealed enhancement of ionic conductivity by a simple incorporation of lithium salts and organic solvents which are compatible with both the polymer and salt components. This work by Tsuchida et al. (*Electrochimica Acta*, Vol. 28 (1983), No. 5, pp. 591–595 and No. 6, pp. 833–837) indicated, however, that the preferred poly(vinylidene fluoride) compositions were capable of exhibiting ionic conductivity above about $10^{-5}$ S/cm only at elevated temperatures, reportedly due to the inability of the composition to remain homogeneous, i.e., free of deleterious salt and polymer crystallites, at or below room temperature. Such limitations apparently led to the abandonment of attempts to implement these compositions in practical applications, such as rechargeable battery cells.

In our earlier investigations which resulted in the inventions claimed in the above-noted related applications, strong, flexible polymeric electrolytic cell separator membrane materials were discovered which readily retain electrolyte lithium salt solutions and remain functional over temperatures ranging well below room temperature. These electrolyte membranes were employed either in the usual manner as separator elements with mechanically assembled battery cell components or in composite battery cells constructed of successively coated layers of electrode and electrolyte compositions. In each of these implementations, however, the polymeric electrolyte/separator elements often contained the lithium electrolyte salts at the time of cell assembly and, due to the hygroscopic nature of those salts, thus necessitated extraordinary environmental conditions during cell assembly.

The present invention provides a manner of utilizing these improved polymeric electrolyte membrane and electrode compositions which substantially eliminates the need for special environmental controls during cell manufacture. Further, the present battery structure with its bonded layers requires less electrolyte, which in previous battery constructions was in part wasted in large voids, thereby yielding a more economical and versatile battery cell product.

SUMMARY OF THE INVENTION

Electrolytic cell electrode and separator elements utilizing polymeric materials according to the present invention comprise the combination of a poly(vinylidene fluoride) copolymer matrix and a compatible organic solvent plasticizer which maintains a homogeneous composition in the form of a flexible, self-supporting film. The copolymer comprises about 75 to 92% by weight vinylidene fluoride (VdF) and 8 to 25% hexafluoropropylene (HFP), a range in which the latter co-monomer limits the crystallinity of the final copolymer to a degree which ensures good film strength while enabling the retention of about 40 to 60% of preferred solvents for lithium electrolyte salts. Within this range of solvent content, the 5 to 7.5% salt ultimately comprising a hybrid electrolyte membrane yields an effective room temperature ionic conductivity of about $10^{-4}$ to $10^{-3}$ S/cm, yet the membrane exhibits no evidence of solvent exudation which might lead to cell leakage or loss of conductivity.

Electrolytic cells, such as rechargeable battery cells, are constructed according to the invention by means of the lamination of electrode and electrolyte cell elements which are individually prepared, by coating, extrusion, or otherwise, from compositions comprising the noted PVdF copolymer materials. For example, in the construction of a lithium-ion battery, a current collector layer of aluminum foil or grid is overlaid with a positive electrode film or membrane separately prepared as a coated layer of a dispersion of intercalation electrode composition, e.g., a $LiMn_2O_4$ powder in a copolymer matrix solution, which is dried to form the membrane. An electrolyte/separator membrane formed as a dried coating of a composition comprising a solution of the VdF:HFP copolymer and a plasticizer solvent is then overlaid upon the positive electrode film. A negative electrode membrane formed as a dried coating of a powdered carbon dispersion in a copolymer matrix solution is similarly overlaid upon the separator membrane layer, and a copper collector foil or grid is laid upon the negative electrode layer to complete the cell assembly. This assembly is then heated under pressure to achieve heat-fused bonding between the plasticized copolymer matrix components and to the collector grids to thereby effect the lamination of the cell elements into a unitary flexible battery cell structure.

At this stage the laminated structure comprises a significant measure of homogeneously distributed organic plasticizer solvent, particularly in the separator membrane stratum, yet is devoid of hygroscopic electrolyte salt. As a result, the "inactive" battery cell may be stored at ambient conditions, either before or after being shaped or further processed, without concern for electrolyte deterioration due to reaction with atmospheric moisture. Only during the final sealing operation when an electrolyte salt solution is introduced to activate the battery cell need there be concern for maintaining anhydrous conditions, as may be effectively achieved in an atmosphere of dry, inert gas.

When it is desired to so activate a battery in the final stage of manufacture, the laminate cell structure is immersed in or otherwise contacted with an electrolyte salt solution which will imbibe into the VdF:HFP copolymer membrane matrix to provide substantially the same ionic conductivity enhancement as achieved by a preformed hybrid electrolyte/separator film containing such an electrolyte salt solution. In order to facilitate the absorption of electrolyte solution, it is preferred that a substantial portion of the plasticizer solvent be previously removed from the copolymer matrix. This may be readily accomplished at any time following the laminating operation by immersion of the cell laminate in a copolymer-inert, low-boiling solvent, such as diethyl ether or hexane, which will selectively leach the plasticizer without significantly affecting the copolymer matrix of the cell element strata. The extracting solvent may then be simply evaporated to yield a dry, inactive battery cell. The laminate structure may be stored in either plasticized or extracted form for an extended period of time prior to activation.

The battery-forming process of the present invention is readily adaptable to batch or continuous operation, since the electrode and electrolyte/separator membrane elements, as well as the collector grid foils, may be shaped or sized prior to laminate assembly or they may be laminated from confluent webs of membrane materials for later shaping or manifolding, as desired. The extraordinary advantage of the present invention lies in the fact that all such operations may be carried out at ambient conditions prior to the introduction of any vulnerable electrolyte salts.

BRIEF DESCRIPTION OF THE DRAWING

The present invention will be described with reference to the accompanying drawing of which.

DESCRIPTION OF THE INVENTION

Figure 1:
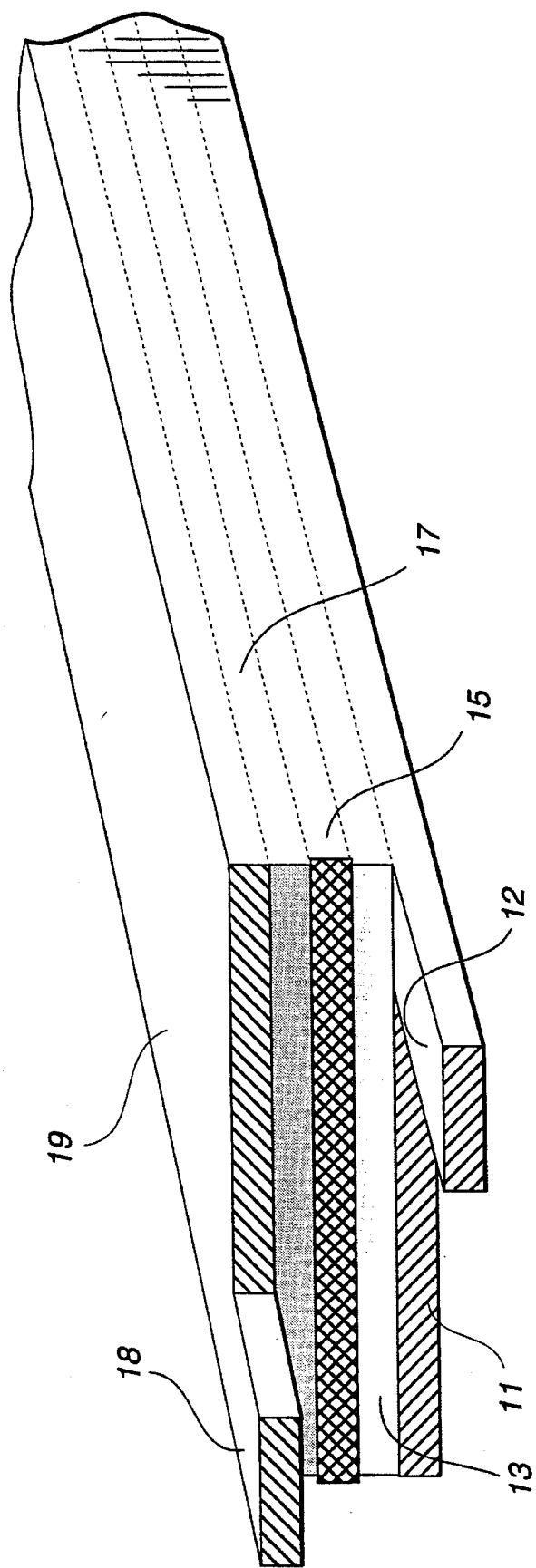
FIG. 1 is a diagrammatic representation of a typical laminated lithium-ion battery cell structure of the present invention.

A laminated rechargeable battery cell structure of the present invention as depicted in FIG. 1 comprises a copper collector foil 11, preferably in the form of an open mesh grid, upon which is laid a negative electrode membrane 13 comprising an intercalatable material, such as carbon or graphite, or a low-voltage lithium insertion compound, such as $WO_2$, $MoO_2$, or Al, dispersed in a polymeric binder matrix. An electrolyte/separator film membrane 15 of plasticized VdF:HFP copolymer is positioned upon electrode element 13 and is covered with a positive electrode membrane 17 comprising a composition of a finely-divided lithium intercalation compound, such as $LiMn_2O_4$, $LiCoO_2$, or $LiNiO_2$, in a polymeric binder matrix. An aluminum collector foil or grid 19 completes the assembly which is then pressed between platens (not shown) under heat and pressure to soften and bond the polymeric components and laminate the membrane and grid layers.

Separator membrane element 15 is generally prepared from a composition comprising the earlier-noted 75 to 92% vinylidene fluoride: 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds, such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

Any common procedure for casting or forming films or membranes of polymer compositions may be employed in the preparation of the present membrane materials. Where casting or coating of a fluid composition is used, e.g., with meter bar or doctor blade apparatus, the viscosity of the composition will normally be reduced by the addition of a readily evaporated casting solvent, such as tetrahydrofuran (THF), acetone, or the like. Such coatings are normally air-dried at moderate temperature to yield self-supporting films of homogeneous, plasticized copolymer compositions. A membrane material, particularly for use as a separator element, may also be formed by allowing the copolymer in commercial form, i.e., bead or powder, to swell in a proportionate amount of plasticizer solvent and then pressing the swollen mass between heated (e.g., about 130° C.) plates or rollers, or extruding the mixture.

Lamination of assembled cell structures may similarly be accomplished by commonly-used apparatus. Preshaped or sized assemblies may be simply pressed for a short while between metal plates weighted at about $3 \times 10^4$ to $5 \times 10^4$ Pa in an oven at a temperature of about 120° to 160° C. Where continuous webs of component membranes are available, the operation may be carried out using heated calendar rollers.

Subsequent to lamination, the battery cell material may be stored under normal conditions, either with the retained plasticizer or as a "dry" sheet after extraction of the plasticizer with a selective low-boiling solvent, for any length of time prior to final battery processing and activation. The laminate may be die-punched into coins for use in the familiar "button" batteries or elongated sheets of the flexible laminated cell material may be rolled with an interposed insulator or manifolded to yield a compact, high-density structure to be sealed with activating electrolyte solution in a protective enclosure.

Although a plasticized copolymer matrix, particularly that of the separator stratum, will readily imbibe an electrolyte salt solution which, in effect, displaces the plasticizer solvent, it is preferable to extract the plasticizer to facilitate absorption of the fluid electrolyte. While an extracted, "dry" battery cell laminate possesses no discernible voids, it appears to exhibit a solvent recovery "memory" which prompts the rapid absorption of an amount of electrolyte solution substantially equal to that of the initial plasticizer solvent. In this manner, the desired ion conductivity range of up to about $10^{-3}$ S/cm is readily achieved.

A number of electrolytic cell laminates with compositions comprising VdF:HFP copolymers within the noted monomer ratio range were prepared and tested for electrolytic and physical suitability for use in rechargeable batteries cells. The following examples are illustrative of such preparation and use.

EXAMPLE 1

A coating composition was prepared by suspending 1.5 g of an 85:15 VdF:HFP copolymer of about $260 \times 10^3$ MW (Atochem Kynar FLEX 2750) in 10 g of acetone and 1.5 g of propylene carbonate (PC). The mixture was warmed to about 50° C. to facilitate dissolution and with occasional agitation a solution was obtained which retained its fluidity upon standing at room temperature for a number of hours. The solution was cast upon a glass plate with a doctor-blade device gapped at about 1.5 mm and was allowed to dry in air at room temperature for about 10 minutes. The resulting dry, clear, tough, flexible film was readily removed from the glass substrate and was divided into test samples. A few samples were completely extracted with diethyl ether to remove the homogeneously dispersed PC plasticizer solvent which was then calculated to be present in the original samples at a level of about 47.7% by weight. Such a film with retained plasticizer solvent (PC) represents the "wet" form of polymeric electrolyte/separator membrane material which may be stored for later convenient assembly with cell electrode elements. The test sample films from which the PC had been extracted represents the "dry" form of the membrane material.

EXAMPLE 2

A control film material was prepared as in Example 1 with the exception that the PC plasticizer solvent was not added. The resulting film was clear, tough, and flexible, although, understandably, not as extensible as the plasticized sample. Samples of the "wet", "dry", and control films were immersed for a few minutes in a typical rechargeable lithium battery electrolyte solution, viz., a 1M solution of $LiPF_6$ in a 1:1 mixture of ethylene carbonate and propylene carbonate (EC/PC). The samples were then wiped to remove any surface accumulation of electrolyte solution, weighed, and extracted with PC and diethyl ether, in turn, to remove imbibed electrolyte solution. It was then calculated that the control sample absorbed about 27% electrolyte solution, while the preswollen "wet" sample took up about 47%, a nearly complete substitution for the original amount of the PC plasticizer in the membrane before immersion in electrolyte. The remaining "dry" sample, that from which the original PC plasticizer had been extracted, absorbed about 37% electrolyte solution, nearly 40% more than the control sample. This increase in absorption capacity is indicative of the swelling "memory" imparted to the film by the initial plasticizer solvent content. The ionic conductivity of the membrane samples thus swollen by immersion in electrolyte solution were tested for conductivity according to the usual ac impedance method on common test equipment, e.g., a Hewlett-Packard computer-controlled HP4192A capacitance bridge operating over the frequency range of 5 Hz to 10 MHz. The "wet", "dry", and control film samples exhibited ionic conductivities of about $3 \times 10^{-4}$, $9 \times 10^{-5}$ and $5 \times 10^{-5}$ S/cm, respectively.

EXAMPLE 3

Test samples were prepared in the manner of Example 2 with substitution of dibutyl phthalate (DBP) for the PC plasticizer solvent. The absorption of electrolyte by the "wet" and "dry" samples during immersion increased significantly over the PC samples, amounting to about 65% and 45%, respectively. Ionic conductivity of the samples increased accordingly, measuring about $2 \times 10^{-3}$ and $3 \times 10^{-4}$ S/cm, respectively.

EXAMPLE 4

Test samples according to Examples 1–3 were prepared with tetrahydrofuran (THF) instead of acetone. The results of electrolyte absorption and ionic conductivity tests were substantially similar.

EXAMPLE 5

Indicative of other film formation techniques which may be used, about 50 parts by weight of the 85:15 copolymer of Examples 1 were suspended, without acetone vehicle solvent, in an equal amount by weight of dibutyl phthalate and allowed to swell until substantially homogeneous. The resulting swollen mass was then pressed at about 130° C. for 1 min between polished aluminum plates separated by 0.15 mm shims. After cooling to room temperature, the resulting clear, flexible film sheet was readily removed from the plates. A sample section of the sheet was then extracted with diethyl ether and reswollen in the electrolyte solution of Example 2 to yield an electrolyte/separator membrane retaining about 40% electrolyte solution and exhibiting an ionic conductivity of about $1 \times 10^{-4}$ S/cm.

EXAMPLE 6

An electrolyte/separator membrane coating solution was prepared by suspending 2.0 g of an 88:12 VdF:HFP copolymer of about $380 \times 10^3$ MW (Atochem Kynar FLEX 2801) in about 10 g of acetone and adding to this mixture about 2.0 g of dibutyl phthalate (DBP). The completed mixture was warmed to about 50° C. to facilitate dissolution and with occasional agitation a solution was obtained which retained its fluidity after standing at room temperature for a number of hours. A portion of the solution was coated on a glass plate with a doctor blade device gapped at about 0.5 mm. The coated film was allowed to dry within the coating enclosure under moderately flowing dry air at room temperature for about 10 min to yield a clear, tough, elastic membrane which was readily stripped from the glass plate. The film was about 85 μm thick with a dry basis weight of about 0.1 kg/m$^2$ and was easily cut into rectangular separator elements of about 175×45 mm which could be stored for days at ambient room conditions without significant weight loss.

EXAMPLE 7

A positive electrode coating composition was prepared by homogenizing in a lid-covered stainless steel blender for about 10 min at 4000 rpm a mixture of 10.5 g of $Li_{1+x}Mn_2O_4$, where $0<x\leq1$ (e.g., $Li_{1.05}Mn_2O_4$ prepared in a manner described in U.S. Pat. No. 5,196,279), sieved through 53 μm, 2.8 g of the VdF:HFP copolymer (FLEX 2801) of example 6, 4.3 g dibutyl phthalate, 1.125 g Super-P conductive carbon, and about 20 g acetone. The resulting paste was degassified by briefly applying a reduced pressure to the mixing vessel, and a portion was then coated on a glass plate with a doctor blade device gapped at about 1.1 mm. The coated layer was allowed to dry within the coating enclosure under moderately flowing dry air at room temperature for about 10 min to yield a tough, elastic film which was readily stripped from the glass plate. The film was about 0.3 mm thick with a dry basis weight of about 0.6 kg/m$^2$ and was easily cut into rectangular electrode elements of about 165×40 mm. These film elements could be stored for days at ambient room conditions without significant weight loss.

EXAMPLE 8

A negative electrode coating composition was prepared by homogenizing in a lid-covered stainless steel blender for about 10 min at 4000 rpm a mixture of 7.0 g of a commercial petroleum coke (ball-milled and sieved through 53 μm), 2.0 g of the VdF:HFP copolymer (FLEX 2801) of example 6, 3.12 g dibutyl phthalate, 0.37 g Super-P conductive carbon, and about 12 g acetone. The resulting paste was degassified by briefly applying a reduced pressure to the mixing vessel, and a portion was then coated on a glass plate with a doctor blade device gapped at about 0.6 mm. The coated layer was allowed to dry within the coating enclosure under moderately flowing dry air at room temperature for about 10 min to yield a tough, elastic film which was readily stripped from the glass plate. The film was about 0.2 mm thick with a dry basis weight of about 0.3 kg/m$^2$ and was easily cut into rectangular electrode elements of about 165×40 mm. These film elements could be stored for days at ambient room conditions without significant weight loss.

EXAMPLE 9

Rechargeable battery structures may be readily assembled from component electrode and electrolyte elements prepared in the manner of the foregoing examples. The conditions of electrode preparation may be varied, either in coating composition consistency or coated layer thickness, to obtain a basis weight ratio of active intercalation compound in the positive:negative electrode combination between about 1.5 and 2.5, preferably about 2.2. A basic battery cell structure is depicted in FIG.1 and was assembled in the following manner:

A 180×40 mm copper current collector foil 11, preferably in the form of an open mesh grid of about 50 μm thickness (e.g., a MicroGrid precision expanded foil marketed by Delker Corporation), was trimmed at one end to form a tab 12 which would subsequently serve as a convenient battery terminal. To enhance the ensuing adherence to its associated electrode element, grid 11 was surface-cleaned by immersing for a few seconds in a common "copper bright" solution (mixed dilute $HNO_3$, $H_2SO_4$), rinsing in water, air drying, dip coating in a 0.5% acetone solution of the VdF:HFP copolymer of Example 6, air drying, and oven heating at about 350° C. for 5–10 seconds. The heating step may be eliminated by using a dip coating solution of about 3% each of VdF:HFP copolymer and dibutyl phthalate. Grid 11 was then laid smoothly upon a flat rigid base plate (not shown) of a good heat conductive material, such as aluminum.

A carbon negative electrode element 13, as prepared in Example 8, was overlaid upon grid 11, and was itself overlaid with electrolyte/separator element 15, as prepared in Example 6. The slightly larger dimensions of element 15 provide protection from possible misalignment and undesirable contact between the electrode elements of the assembled battery structure. Positive electrode element 17, as prepared in Example 7, was then positioned upon separator element 16, and an aluminum collector foil or grid 19, treated in a manner similar to grid 11, but for a simple initial cleaning immersion in acetone, was positioned upon electrode 17 so as to provide a transversely situated terminal tab 18. It should be noted that at least one of the current collector elements preferably has an open grid structure to facilitate the passage of extraction and activating fluids during the ensuing battery preparation operations.

The resulting structure was then covered with a second similar rigid plate (not shown), and the assembly was placed in a 135° C. oven and weighted with about 24 kg to provide a pressure of about $3.7 \times 10^4$ Pa at the element interfaces. The assembly remained in the oven for about 30 minutes to ensure temperature equilibrium in the plate sinks and effect adequate fusion of the battery elements. The laminate structure was then remove from the oven, unweighted, and cooled between a pair of room temperature metal plates. In order to ensure optimum bonding or embedding of the collector grids in a final single cell structure, about 50 μm membranes of electrolyte/separator composition (not shown) may be overlaid upon the grid elements prior to lamination, or, preferably, about 20 μm coatings of the composition may be applied over the surfaces of a laminated structure.

EXAMPLE 10

The battery structure of Example 9 was prepared for "dry" film activation, as described in Example 2, by immersion of the laminate structure in diethyl ether at room temperature for about 25 minutes to remove substantially all of the DBP plasticizer from the layered elements, notably the electrolyte/separator 15. This extraction was carried out with a minimum of agitation of the immersion solvent.

Extraction time for similar structure samples was reduced to about 10 min with mild agitation, e.g., from stirring or bubbling air, and was optimally reduced to about 3 minutes with continuous countercurrent processing using fresh extraction solvent. Other useful solvents include pentane, petroleum ether, hexane, and cyclohexane.

EXAMPLE 11

An extracted battery structure from Example 10 was activated in preparation for charge/discharge cycling by immersion under a substantially moisture-free atmosphere in a 1M electrolyte solution of $LiPF_6$ in 50:50 ethylene carbonate (EC):dimethyl carbonate (DMC) for about 20 min during which the laminated battery imbibed about 31% of its extracted weight. Following a mild wiping with absorbent materials to remove surface electrolyte, the activated battery structure was hermetically sealed, but for the extending terminal tabs 12, 18, within a polyolefin envelope (not shown) to maintain a moisture-free environment.

EXAMPLE 12

An extracted battery structure from Example 10 was activated in preparation for charge/discharge cycling by immersion in a 1M solution of $LiPF_6$ in 50:50 ethylene carbonate (EC):propylene carbonate (PC) for about 30 min during which the laminated battery imbibed about 28% of its extracted weight.

EXAMPLE 13

Figure 2:
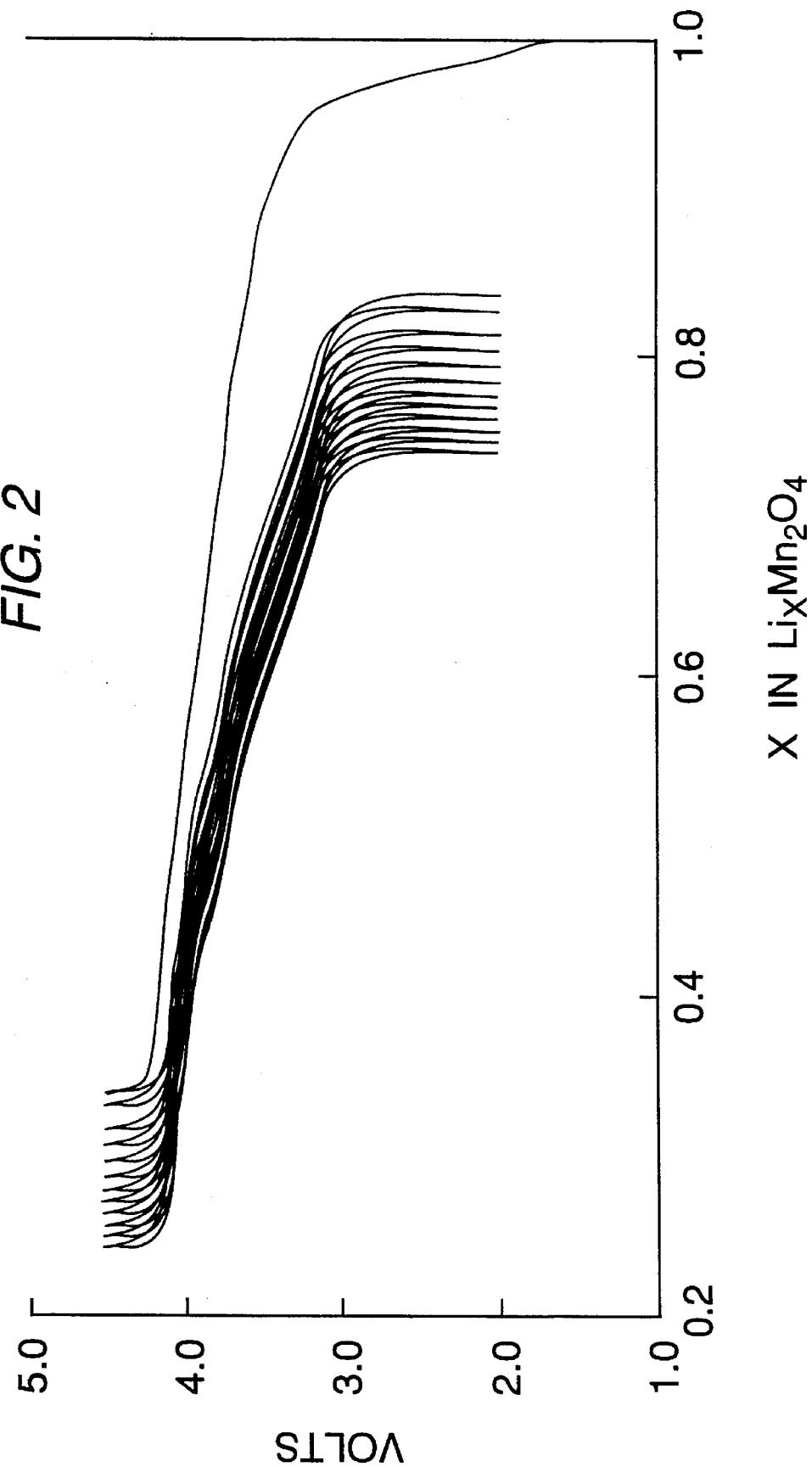
FIG. 2 is a graph tracing recycling voltage as a function of intercalated lithium for a laminated lithium-ion battery cell of FIG. 1.
Figure 3:
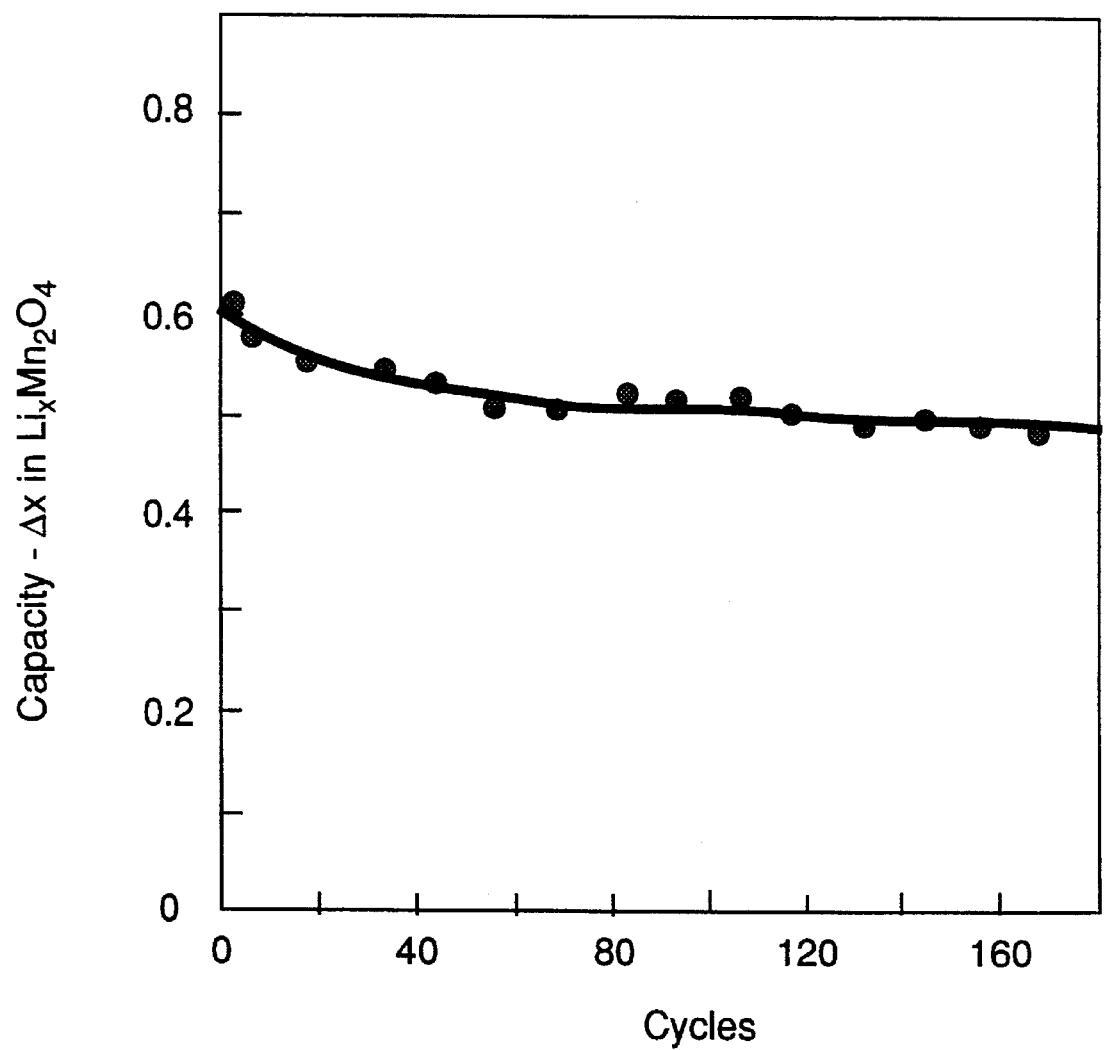
FIG. 3 is a graph of the capacity of a laminated lithium-ion battery cell of FIG. 1 as a function of the number of charge/discharge cycles.

The activated battery of Example 11 was tested by cycling between 2 and 4.5 V at a rate of 10 mA which was maintained constant within 1% in a "Mac Pile" cycling system from Bio-Logic of Claix, France. Operating in the galvanostatic mode, this system calculated from elapsed time and current the lithium content, x, in the $Li_xMn_2O_4$ positive electrode. The multicycle trace of these data are shown in FIG. 2 and is indicative of the stability of the battery. The trace of cell capacity over extended charging cycles is shown in FIG. 3. Similar testing of the battery of Example 12 produced substantially similar results.

EXAMPLE 14

Figure 4:
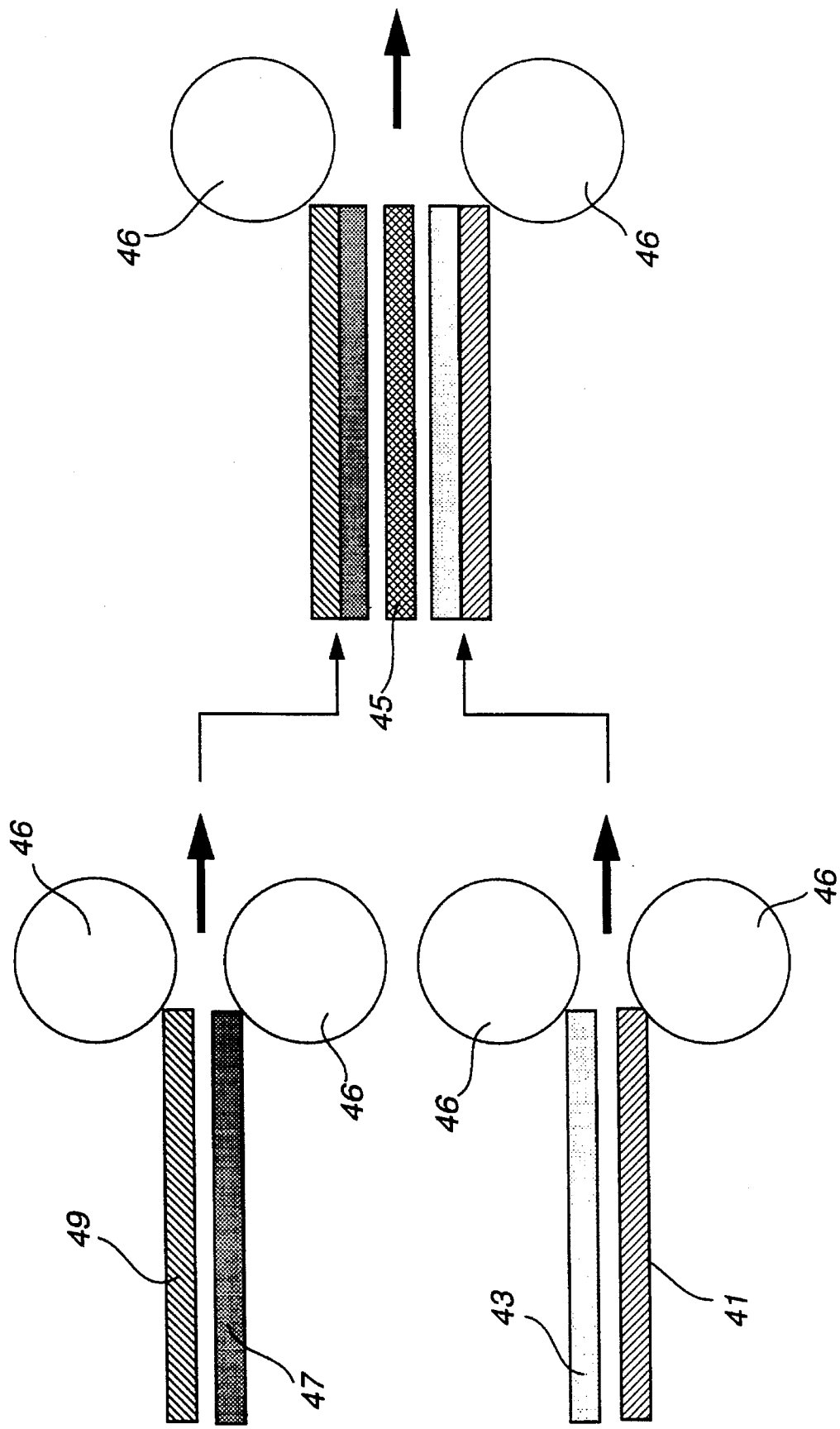
FIG. 4 is a diagrammatic representation of a laminating process for preparing a battery cell structure of the present invention.

In a preferred variant of the present laminate battery assembly method, as depicted in FIG. 4, a copper collector grid 41 and a negative electrode element 43, as prepared in Examples 9 and 8, were assembled between buffer sheets of abherent polyethylene terephthalate (not shown) and were passed through the rolls 46 of a commercial card-sealing laminator at a temperature of about 150° C. A 50 μm film of electrolyte/separator composition may also be inserted on top of the grid prior to lamination. A treated aluminum collector grid 49 and a positive electrode element 47, as prepared in Examples 9 and 7, were similarly laminated to provided a pair of electrode/collector battery elements. An electrolyte/separator element 45 from Example 6 was then inserted between the electrode/collector pair and the resulting assembly was passed through the laminator device at a roll temperature of about 120° C. with somewhat less pressure to obtain the laminate battery structure. The laminate was then immersed under moisture-free conditions in a mildly stirred electrolyte solution from Example 11 for about 40 minutes to effect substantial replacement of the DBP plasticizer with the electrolyte solution. The activated battery, having a thickness of about 0.5 mm, was then sealed in a protective polyolefin envelope enclosure (not shown) and tested according to Example 13. The resulting performance trace substantially matched that of FIG. 2.

EXAMPLE 15

A laminated battery structure of Example 14 was extracted of plasticizer by immersion in stirred diethyl ether for about 10 minutes and was then activated by immersion in electrolyte solution as described in Example 12. The battery was then heat-sealed for later testing in a close-fitting envelope of moisture-proof barrier material, such as polyolefin/aluminum foil/polyester laminate sheeting commercially used for foodstuff enclosures.

EXAMPLE 16

An extracted battery structure was prepared as in Example 15, but, instead of being activated by immersion, was inserted directly into a similar envelope along with an amount of electrolyte solution equal to that imbibed by the immersed sample of Example 15. The envelope was then hermetically sealed for later testing. After 3 days the sample batteries were tested through the usual cycling series with substantially the same results as appear in FIG. 2. As an alternative procedure, electrolyte solution may be injected into a sealed battery enclosure in a manner which substantially maintains the seal.

EXAMPLE 17

Figure 5:
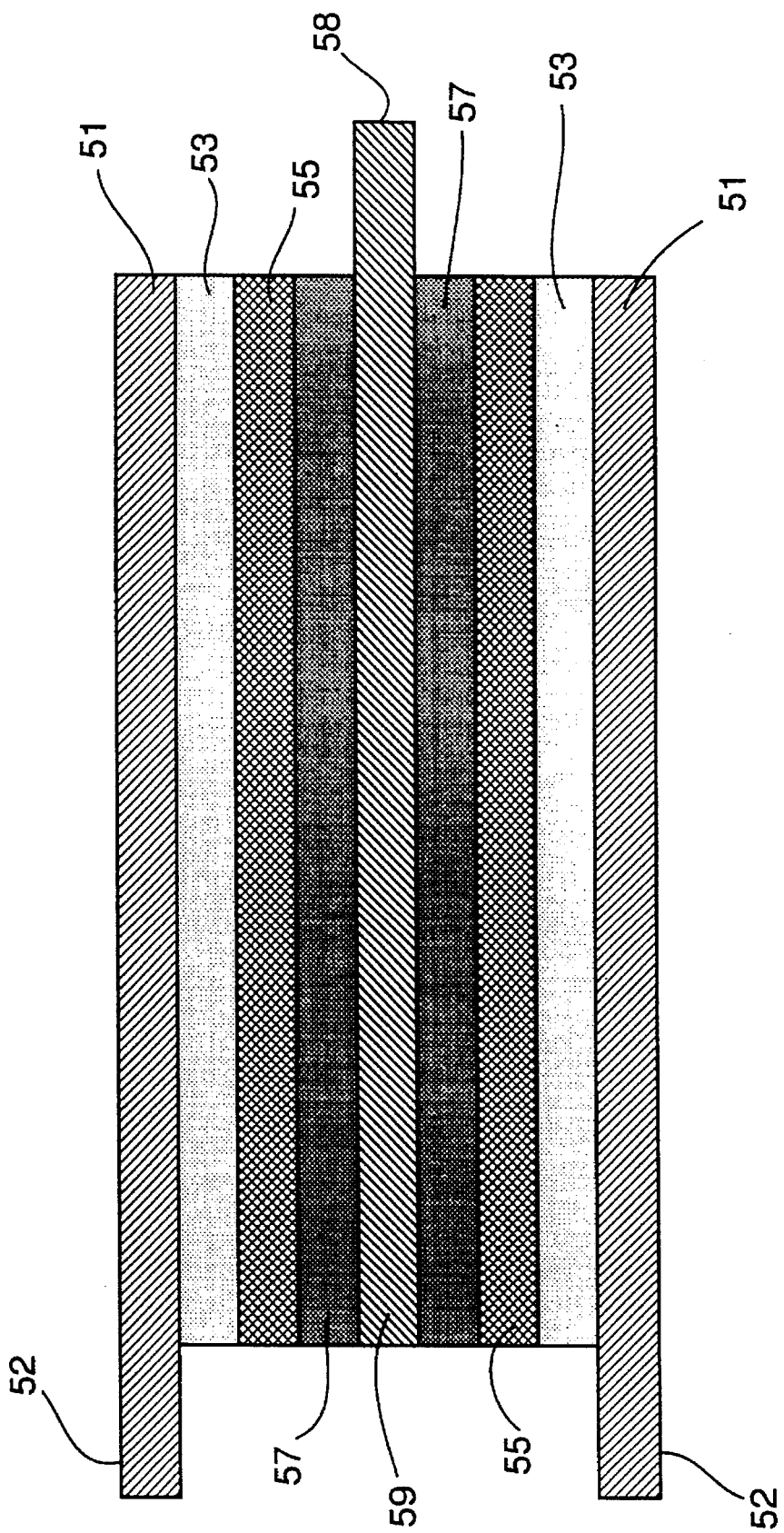
FIG. 5 is a diagrammatic representation of a multicell battery cell structure of the present invention.

A multicell battery configuration as depicted in FIG. 5 was prepared in the manner generally described in Example 9, with the exception that the lay-up of the copper collector 51, negative electrode 53, electrolyte/separator 55, positive electrode 57, and aluminum collector 59 battery elements was extended as shown in this FIG. Tabs 52, 58 of the collector elements form respective common terminals for the battery structure. After extraction and activation according to Examples 10 and 11, the battery of about twice the capacity of the earlier sample continued to perform in the manner shown in FIG. 2. Batteries of proportionately greater capacity can readily be constructed by repeating, as desired, the sequences of battery elements. Consideration should, of course, be given to the anticipated increase in processing time occasioned by the increased mass of material through which extraction and activation fluids will pass.

EXAMPLE 18

Figure 6:
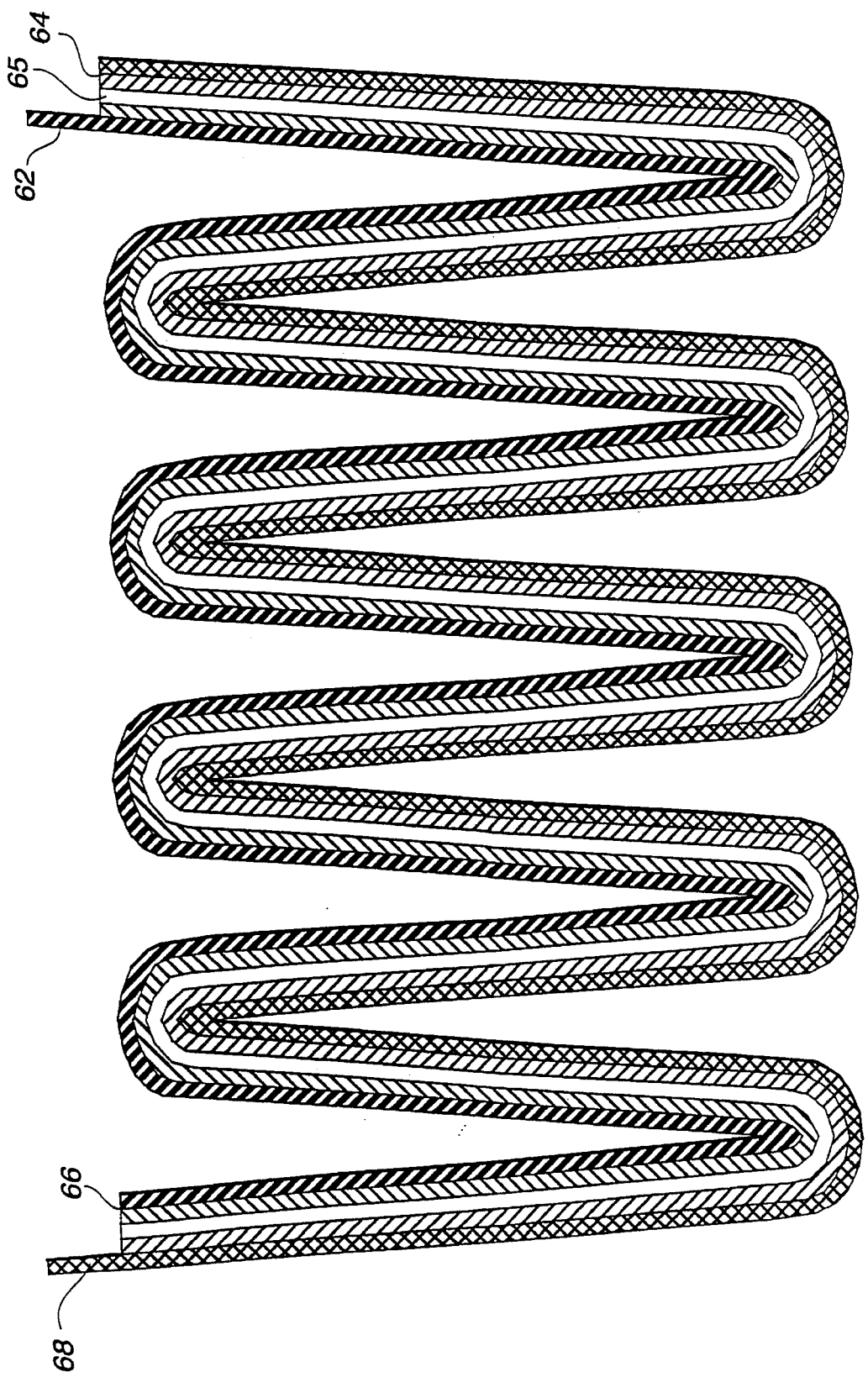
FIG. 6 is a diagrammatic representation of a manifold battery cell structure of the present invention.

A manifold battery configuration of FIG. 6 also provided extended capacity with excellent cycling performance and was constructed with greatly reduced handling. For this example a negative electrode coating composition was prepared by stirring in a lid-covered glass vessel a mixture of 7.0 g of a commercial microcrystalline graphite (about 5 μm), 2.0 g of the VdF:HFP copolymer (FLEX 2801) of example 6, 3.12 g dibutyl phthalate, 0.37 g Super-P conductive carbon, and about 28 g acetone. The composition was processed in the manner of Example 8 using a doctor blade gap of about 0.66 mm to yield a negative electrode film with dry basis weight of about 0.23 kg/m$^2$. A 600×40 mm strip was cut from the film and was laminated to a 620×40 mm treated copper collector grid in the manner of Example 14 to form a negative electrode/collector element 64.

A similarly sized positive electrode/collector 66 was formed according to Example 14 by laminating a treated aluminum grid to a positive electrode film prepared from a stirred homogeneous mixture of 10.5 g of lithium manganate (e.g., $Li_{1.05}Mn_2O_4$) sieved through 53 μm, 1.61 g of the VdF:HFP copolymer (FLEX 2801) of example 6, 1.63 g dibutyl phthalate, 0.5 g Super-P conductive carbon, and about 16 g acetone. The composition was coated at a blade gap of about 1.1 mm to yield an electrode film with dry basis weight of about 0.6 kg/m$^2$.

Following the procedure in Example 14, the electrode/collector pair were laminated with a 600×40 mm strip of the electrolyte/separator membrane 65 of Example 6 to form a composite battery sheet which was extracted and activated by immersion as in Example 15. The sheet was then folded in zig-zag fashion as depicted in FIG. 6 and pressed into a tight manifold structure in which only respective portions of the separate continuous positive and negative collector surfaces were in contact. The manifold battery was then heat-sealed, but for the protruding terminal tabs 62, 68, within a moisture-proof envelope (not shown). Cycle test results were similar to FIG. 2.

EXAMPLE 19

Figure 7:
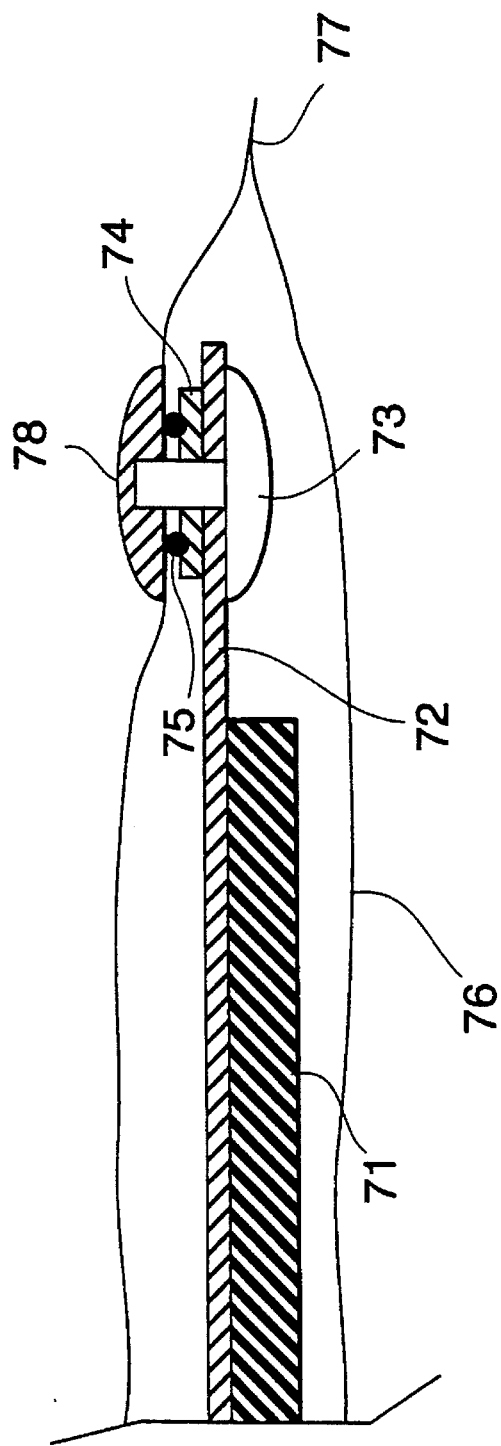
FIG. 7 is a diagrammatic representation of an enclosure and terminal contact structure for a battery cell of the present invention.

A simplified battery construction which improves the integrity of the battery enclosure seal in depicted in FIG. 7. This construction in effect eliminates the protrusion of collector grid terminal tabs from the battery enclosure during sealing and thus eliminates the possibility of leaks in that seal area. In this modification, an activated battery 71, e.g., from Example 15, had attached through its terminal tab 72 (only one tab is shown for clarity) a conductive contact member, such as aluminum rivet 73, which was affixed with an inner sealing member, such as interference fit washer 74, optionally bearing a supplemental sealing surface member, such as O-ring 75. This assembly was inserted within a previously described moisture-proof envelope enclosure 76 the access opening of which was closed with an uninterrupted seal 77 effected by heating. A battery terminal contact was then established at the exterior of the battery enclosure by means of a conductive member, such as aluminum push nut 78, which was pressed onto the stud of rivet 73, thereby piercing the wall of envelope 76 in the process of engaging stud 73. As a result of this engagement, however, the wall material of envelope 76 was firmly pressed between nut 78 and washer 74 or its sealing surface member 75 to maintain the hermetic seal in the area of the pierced opening. The companion terminal tab (not shown) of battery 71 was similarly treated with a rivet assembly to provide the remaining terminal contact at the exterior of the battery enclosure. Spring clips were readily attached to the terminal contacts for the purpose of testing the battery. In order to ensure electrical isolation of the terminals where the envelope wall material comprises a metallic foil, the enclosure may be formed of separate sheets of barrier material sealed about their perimeter with the terminals in opposite enclosure walls.

EXAMPLE 20

Figure 8:
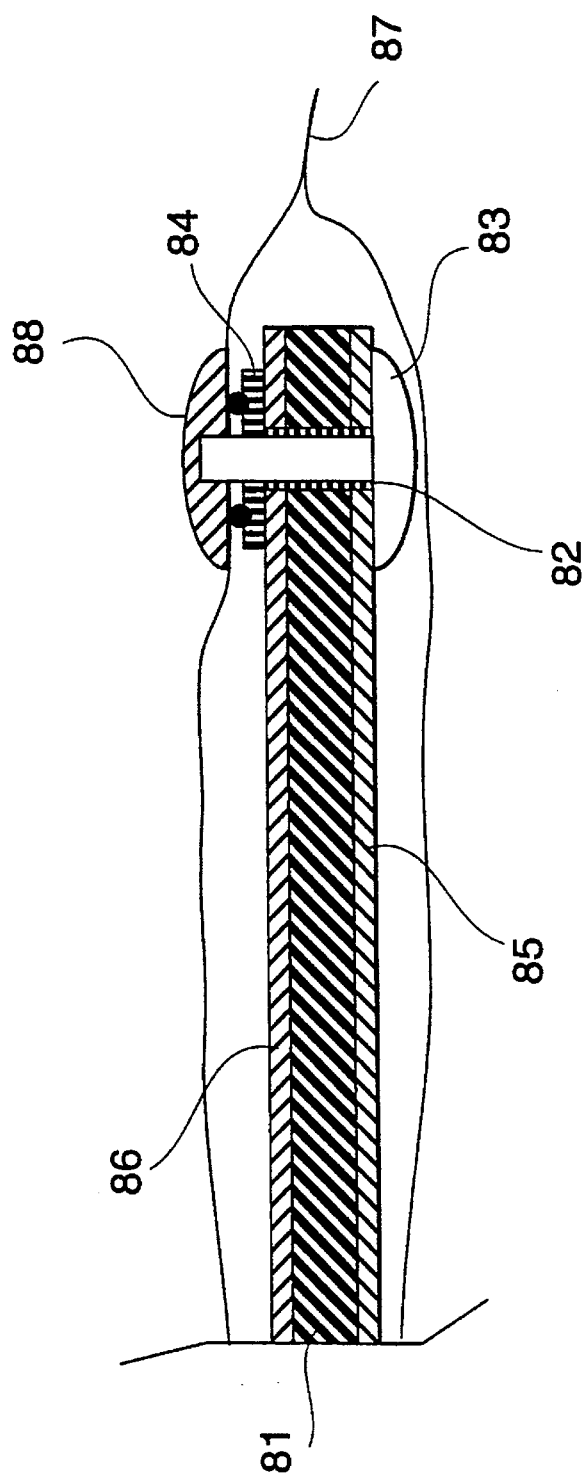
FIG. 8 is a diagrammatic representation of a variation of an enclosure and terminal contact structure for a battery cell of the present invention.

The use of extending terminal tabs of collector elements may be eliminated with a battery construction variation depicted in FIG. 8. Here the stud of conductive contact member 83 bears an insulating coating 82 of Teflon polymer, or the like, along the portion which penetrates the body of battery 81. Engagement washer 84 is likewise of insulating material, thereby isolating conductive contact to that between the head face of member 83 and the surface of selected battery terminal grid 85. Conductive push nut 88 completes the conductive circuit through contact with the uninsulated distal end of the stud of member 83. The companion external terminal contact for the battery is established by inserting a second contact member (not shown) through battery 81 in the opposite direction in order to engage its conductive head face with battery terminal grid 86. In the event that both external terminal contacts are preferred to be at the same battery enclosure surface, the insulating surface of one of the contact member assembly may be relocated from engagement washer 84 to the head face of member 83.

EXAMPLE 21

Figure 9:
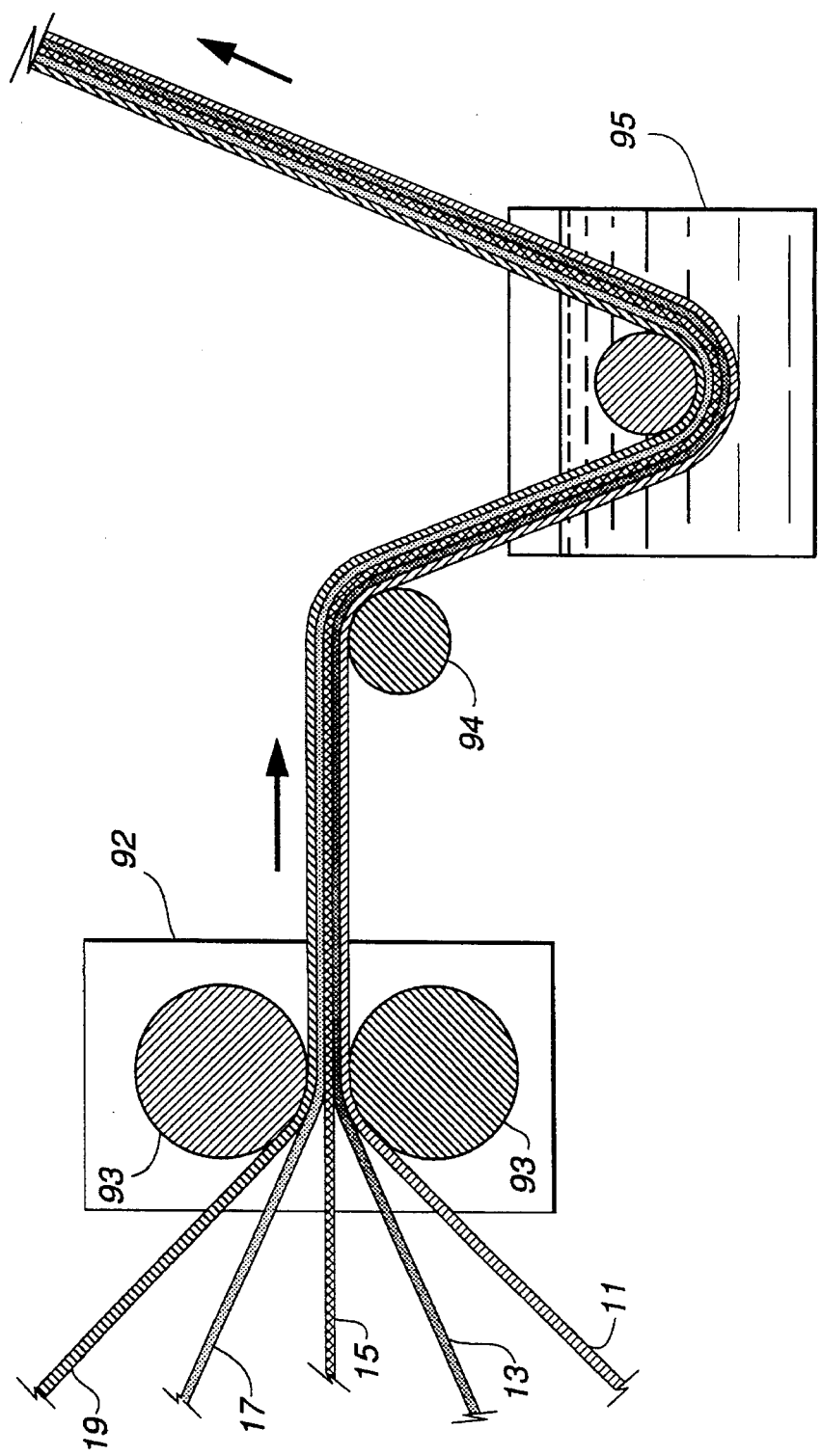
FIG. 9 is a diagrammatic representation of a continuous laminating process for preparing a battery cell material of the present invention.

The activatable battery structure materials of the present invention may be prepared in a continuous process such as depicted in FIG. 9. In this variant, individual continuous films of collector, electrode, and electrolyte/separator materials 11–19 described in the previous examples are laminated at rollers 93 in the heated environment of oven 92. After such lamination, the composite battery web is cooled at roller 94 and then passed through extraction solution bath 95 to remove the plasticizing solvent before being stored for subsequent processing into any of the noted battery configurations. Batteries prepared from sections of the composite web material find particular utility in the terminal contact structure of Example 20.

The battery structures of the present invention may be successfully activated with any of the numerous compositions used as liquid electrolyte solutions. Notably, there may be employed in the electrolyte solution such organic solvents as dimethyl carbonate, diethoxyethane, diethyl carbonate, dimethoxyethane, and dipropyl carbonate. Also, in the formulation of the activating electrolyte solutions, other useful lithium salts, including $LiClO_4$, $LiN(CF_3SO_2)_2$, $LiBF_4$, $LiCF_3SO_3$, and $LiSbF_6$, may be employed in solution concentrations of between about 0.5 and 2M. Of particular utility are the exceptional ethylene carbonate/dimethyl carbonate compositions of $LiPF_6$ and mixtures with $LiBF_4$ described in U.S. Pat. No. 5,192,629. While the above examples have related in large measure the preparation of a number of battery assemblies, other variants are likewise to be included within the scope of the invention as set out in the appended claims.

What is claimed is:

1. A rechargeable battery structure comprising a positive electrode element, a negative electrode element, and a separator element disposed therebetween characterized in that a) each of said elements comprises a flexible, self-supporting, polymeric matrix film composition substantially devoid of electrolytic salt;

b) each said element is bonded to contiguous elements at its respective interfaces to form a unitary flexible laminate structure; and c) said separator element film is substantially devoid of pores and comprises a composition initially comprising a polymeric material and 20 to 70% by weight of a compatible plasticizer therefor and from which composition at least a portion of said plasticizer has been removed, said separator element thereby being in a preconditioned state conducive to absorption of electrolytic solution.

2. A rechargeable battery structure according to claim 1 wherein each said element is heat-fused at its respective interfaces.

3. A rechargeable battery structure comprising a positive electrode element, a negative electrode element, and a separator element disposed therebetween characterized in that a) each of said elements comprises a flexible, self-supporting, polymeric matrix film composition;

b) each said element is bonded to contiguous elements at its respective interfaces to form a unitary flexible laminate structure; and c) said separator element composition comprises a copolymer of vinylidene fluoride with 8 to 25% by weight hexafluoropropylene and has homogeneously distributed therein 20 to 70% by weight of a compatible organic plasticizer for said copolymer.

4. A rechargeable battery structure according to claim 3 wherein said separator element composition comprises 10 to 30% by weight based on said copolymer of an inorganic filler selected from fumed alumina and silanized fumed silica.

5. A rechargeable battery structure according to claim 3 wherein said positive electrode element composition comprises a lithium intercalation compound homogeneously distributed in a matrix of said separator element composition.

6. A rechargeable battery structure according to claim 5 wherein said lithium compound has a nominal formula selected from $LiMn_2O_4$, $LiCoO_2$, and $LiNiO_2$.

7. A rechargeable battery structure according to claim 6 wherein said lithium compound has the formula $Li_{1+x}Mn_2O_4$ where $0 \leq x \leq 1$.

8. A rechargeable battery structure according to claim 5 wherein said negative electrode element composition comprises a compound selected from the group consisting of carbon intercalation compounds and low-voltage lithium insertion compounds homogeneously distributed in a matrix of said separator element composition.

9. A rechargeable battery structure according to claim 8 wherein said negative electrode element composition compound is selected from the group consisting of petroleum coke and graphite.

10. A rechargeable battery structure according to claim 9 wherein said plasticizer is selected from the group consisting of ethylene carbonate, propylene carbonate, dibutyl phthalate, dimethyl phthalate, diethyl phthalate, tris butoxyethyl phosphate, and mixtures thereof.

11. A rechargeable battery structure comprising a laminate structure according to claim 3 from which at least a portion of said plasticizer has been extracted.

12. A rechargeable battery structure comprising a laminate structure according to claim 3 in which at least a portion of said plasticizer has been replaced with a lithium battery electrolyte solution.

13. A rechargeable battery structure according to claim 12 wherein said electrolyte solution comprises a 0.5 to 2M solution of:

a) a lithium salt selected from the group consisting of $LiPF_6$, $LiClO_4$, $LiN(CF_3SO_2)_2$, $LiBF_4$, $LiCF_3SO_3$, $LiSbF_6$, and mixtures thereof; in b) an organic solvent selected from the group consisting of ethylene carbonate, propylene carbonate, dimethyl carbonate, diethoxyethane, diethyl carbonate, dimethoxyethane, dipropyl carbonate, and mixtures thereof.

14. A rechargeable battery structure according to claim 1 wherein the removed plasticizer has been replaced with a battery electrolyte solution.

15. A rechargeable battery structure comprising, in sequence, a positive current collector element, a positive electrode element, a separator element, a negative electrode element, and a negative current collector element characterized in that a) each of said collector elements comprises a flexible electrically-conductive foil, b) each of the others of said elements comprises a flexible, self-supporting, polymeric matrix film composition substantially devoid of electrolytic salt;

c) each said element is bonded to contiguous elements at its respective interfaces to form a unitary flexible laminate structure; and d) said separator element film is substantially devoid of pores and comprises a composition initially comprising a polymeric material and 20 to 70% by weight of a compatible plasticizer therefor and from which composition at least a portion of said plasticizer has been removed, said separator element thereby being in a preconditioned state conducive to absorption of electrolytic solution.

16. A rechargeable battery structure according to claim 15 wherein the removed plasticizer has been replaced with a battery electrolyte solution.

17. A rechargeable battery structure comprising, in sequence, a positive current collector element, a positive electrode element, a separator element, a negative electrode element, and a negative current collector element characterized in that a) each of said collector elements comprises a flexible electrically-conductive foil, b) each of the others of said elements comprises a flexible, self-supporting, polymeric matrix film composition;

c) each said element is bonded to contiguous elements at its respective interfaces to form a unitary flexible laminate structure; and d) said separator element composition comprises a copolymer of vinylidene fluoride with 8 to 25% by weight hexafluoropropylene and has homogeneously distributed therein 20 to 70% by weight of a compatible organic plasticizer for said copolymer.

18. A rechargeable battery structure according to claim 15 wherein at least one of said collector element foils comprises an open-mesh grid.

19. A rechargeable battery structure according to claim 18 wherein said at least one collector element is at least partially embedded in the electrode element interfacing therewith.

20. A rechargeable battery structure according to claim 18 wherein said structure comprises an additional bonded film of said separator composition overlaying said at least one collector element.

21. A rechargeable battery structure according to claim 17 wherein said positive electrode element composition comprises a lithium intercalation compound homogeneously distributed in a matrix of said separator element composition.

22. A rechargeable battery structure according to claim 21 wherein said lithium compound has a nominal formula selected from $LiMn_2O_4$, $LiCoO_2$, and $LiNiO_2$.

23. A rechargeable battery structure according to claim 22 wherein said lithium compound has the formula $Li_{1+x}Mn_2O_4$ where $0 \leq x \leq 1$.

24. A rechargeable battery structure according to claim 21 wherein said negative electrode element composition comprises a carbon intercalation compound homogeneously distributed in a matrix of said separator element composition.

25. A rechargeable battery structure according to claim 24 wherein said carbon compound is selected from the group consisting of petroleum coke and graphite.

26. A rechargeable battery structure comprising a laminate structure according to claim 24 from which at least a portion of said plasticizer has been extracted.

27. A rechargeable battery structure comprising a laminate structure according to claim 24 in which at least a portion of said plasticizer has been replaced with a lithium battery electrolyte solution.

28. A rechargeable battery structure according to claim 26 wherein said flexible laminate structure is arranged in a manifold zig-zag fashion whereby respective portions of the separate continuous positive and negative collector elements are in electrical contact.

29. A rechargeable battery structure according to claim 26 which further comprises a moisture-proof barrier material forming a hermetically sealed enclosure about said flexible laminate structure.

30. A rechargeable battery structure according to claim 29 which further comprises means individually communicating electrically between said respective positive and negative current collector elements and the exterior of said enclosure.

31. A rechargeable battery structure according to claim 30 wherein said communicating means comprises:

a) a first electrically conductive member in electrical contact within said enclosure with one of said collector elements;

b) means associated with said first member for piercing said enclosure barrier material to thereby communicate electrically with the exterior of said enclosure;

c) a second member engaging said first member at the exterior of said enclosure; and d) means actuated by the engagement of said first and second members for maintaining a hermetic seal about the pierced area of said enclosure barrier material.

32. A rechargeable battery structure according to claim 31 wherein said first member comprises means for preventing electrical contact with the other of said collector elements.

* * * * *